(12) United States Patent
Kim (10) Patent No.: US 11,118,621 B2
(45) Date of Patent: Sep. 14, 2021

(54) VIBRATION REDUCTION SHAFT

(71) Applicant: KOREA AEROSPACE RESEARCH INSTITUTE, Daejeon (KR)

(72) Inventor: Dae Kwan Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 501 days.

(21) Appl. No.: 16/126,600

(22) Filed: Sep. 10, 2018

(65) Prior Publication Data

US 2019/0128315 A1 May 2, 2019

(30) Foreign Application Priority Data

Oct. 30, 2017 (KR) .......................... 10-2017-0142620

(51) Int. Cl.
*F16C 3/02* (2006.01)
*F16F 15/124* (2006.01)

(52) U.S. Cl.
CPC ............ *F16C 3/023* (2013.01); *F16F 15/124* (2013.01)

(58) Field of Classification Search
CPC ........ F16C 3/023; F16C 2361/61; F16D 3/12; F16D 2300/22; F16F 15/124; F16F 15/268; F16F 15/3153; F16F 15/322; F16H 55/14; Y10T 464/50
USPC ........................................................ 464/180
See application file for complete search history.

(56) References Cited

U.S. PATENT DOCUMENTS

| | | | | |
|---|---|---|---|---|
| 4,583,272 A * | 4/1986 | Keller | ...................... | B41J 11/04 |
| | | | | 29/895.32 |
| 4,933,583 A * | 6/1990 | Ripplinger | ............. | H02K 1/278 |
| | | | | 464/180 |
| 6,997,812 B2 * | 2/2006 | Sasaki | .................. | A01D 34/905 |
| | | | | 464/180 |
| 7,134,964 B2 * | 11/2006 | Dine | ....................... | F16C 3/023 |
| | | | | 464/180 |
| 7,341,550 B2 * | 3/2008 | van Haag | .............. | D21G 1/008 |
| | | | | 101/216 |
| 7,490,585 B2 * | 2/2009 | Friedrich | .............. | F16F 15/264 |
| | | | | 464/180 |
| 8,057,315 B2 * | 11/2011 | Campbell | ............... | F16F 15/10 |
| | | | | 464/180 |
| 8,616,986 B2 * | 12/2013 | Nakagawa | ................ | F16D 3/12 |
| | | | | 464/76 |
| 9,592,847 B2 * | 3/2017 | Hansen | ....................... | F16D 3/76 |
| 9,759,287 B2 * | 9/2017 | Exner | ........................ | F16D 3/74 |

(Continued)

FOREIGN PATENT DOCUMENTS

| | | |
|---|---|---|
| KR | 1020070022950 A | 2/2007 |
| KR | 1020110062014 A | 6/2011 |

(Continued)

*Primary Examiner* — Josh Skroupa
(74) *Attorney, Agent, or Firm* — Rabin & Berdo, P.C.

(57) ABSTRACT

A vibration reduction shaft includes a cylindrical outer shaft having an inner hollow portion, in which the outer shaft includes: a first member (110) and a second member (120) which are disposed to be spaced apart from each other in a longitudinal direction of the shaft; and a vibration reduction region (150) which is disposed between the first member and the second member, and multiple connecting members (151), which connect the first member and the second member in an axial direction, are disposed to be spaced apart from one another within the vibration reduction region.

4 Claims, 9 Drawing Sheets

(56) References Cited

U.S. PATENT DOCUMENTS

| | | | |
|---|---|---|---|
| 10,205,364 B2* | 2/2019 | Borgen | H02K 16/00 |
| 10,823,247 B2* | 11/2020 | Kaneko | F16F 9/145 |
| 2015/0037086 A1* | 2/2015 | Brandl | F16D 3/74 |
| | | | 403/220 |
| 2015/0354636 A1* | 12/2015 | Kaneda | F16D 1/0864 |
| | | | 464/93 |

FOREIGN PATENT DOCUMENTS

| | | | |
|---|---|---|---|
| KR | 10-1270945 B1 | 6/2013 | |
| WO | WO-2013144855 A2 * | 10/2013 | H02K 7/003 |

* cited by examiner

VIBRATION REDUCTION SHAFT

CROSS-REFERENCE TO RELATED APPLICATIONS

This application claims the priority of Korean Patent Application No. 10-2017-0142620 filed on Oct. 30, 2017, in the Korean Intellectual Property Office, the disclosure of which is incorporated herein by reference.

BACKGROUND

Field

The present disclosure relates to a technology which is applied to a gear and a rotating shaft used to transmit rotational motion as a device for reducing vibration generated by the rotational motion, and particularly, to a technology capable of reducing vibration, which is generated by a rotation, by applying a rotating shaft with a function of reducing vibration under a condition in which it is difficult to apply a vibration reduction device and a vibration reduction gear because the vibration reduction gear has a small gear area like a bevel gear.

Description of the Related Art

A gear is a mechanical element that transmits rotational torque to two or more shafts and serves to adjust a rotational speed and a torque transmission ratio through a gear ratio, and the gear also has a drawback in that an engagement transmission error, which causes noise and vibration, occurs.

Vibration, which is transmitted from a drive shaft, is also transmitted in addition to the transmission of the rotational torque, and vibration is generated due to a gear such as backlash and thus causes vibration and noise of a rotational mechanism system, which causes deterioration in performance and a reduction in lifespan.

To solve the aforementioned problems, Korean Patent No. 10-1270945 in the related art discloses a technology which generates an isolation mode by using a viscoelastic material and a groove in a gear shaft for transmitting rotational power, thereby reducing unnecessary high-frequency vibration.

However, in the related art, a general gear having a predetermined or more planar area needs to be provided to apply the technology to a gear train, but there is a limitation in applying the technology to a gear such as a bevel gear having a small gear area or a thick shape.

SUMMARY

An object of the present disclosure is to provide a vibration reduction shaft for reducing vibration of a shaft which is the problem in the related art, and particularly, to provide a structure of a shaft which may be applied to a gear such as a bevel gear having a small area or a thick shape.

Another object of the present disclosure is to provide a technology which may be applied to a gear train system having a small gear area and a thick shape in order to reduce high-frequency vibration in the gear train system used to transmit a rotation, and particularly, to provide a technology which may be applied to a rotary gimbal device of a communication antenna for an artificial satellite, a camera device having rotational motion, and the like which require high vibration stability.

The present disclosure provides a vibration reduction shaft including a cylindrical outer shaft having an inner hollow portion, in which the outer shaft includes: a first member 110 and a second member 120 which are disposed to be spaced apart from each other in a longitudinal direction of the shaft; and a vibration reduction region 150 which is disposed between the first member and the second member, and multiple connecting members 151, which connect the first member and the second member in an axial direction, are disposed to be spaced apart from one another within the vibration reduction region.

One end of the connecting member may be integrally coupled to any one of the first and second members, and the other end of the connecting member may be coupled to the other of the first and second members through a damping material.

A first stopper 155, which has one end attached to the first member and the other end formed with a protrusion 155a, and a second stopper 156, which has one end attached to the second member and the other end formed with a groove 156a that accommodates the protrusion 155a, are disposed within the vibration reduction region, and the other end of the first stopper and the other end of the second stopper are spaced apart from each other at a predetermined interval d.

The present disclosure may be applied to a gear train system having a small gear area and a thick shape in order to reduce high-frequency vibration in the gear train system used to transmit a rotation, and particularly, the present disclosure may be applied to a rotary gimbal device of a communication antenna for an artificial satellite, a camera device having rotational motion, and the like which require high vibration stability.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
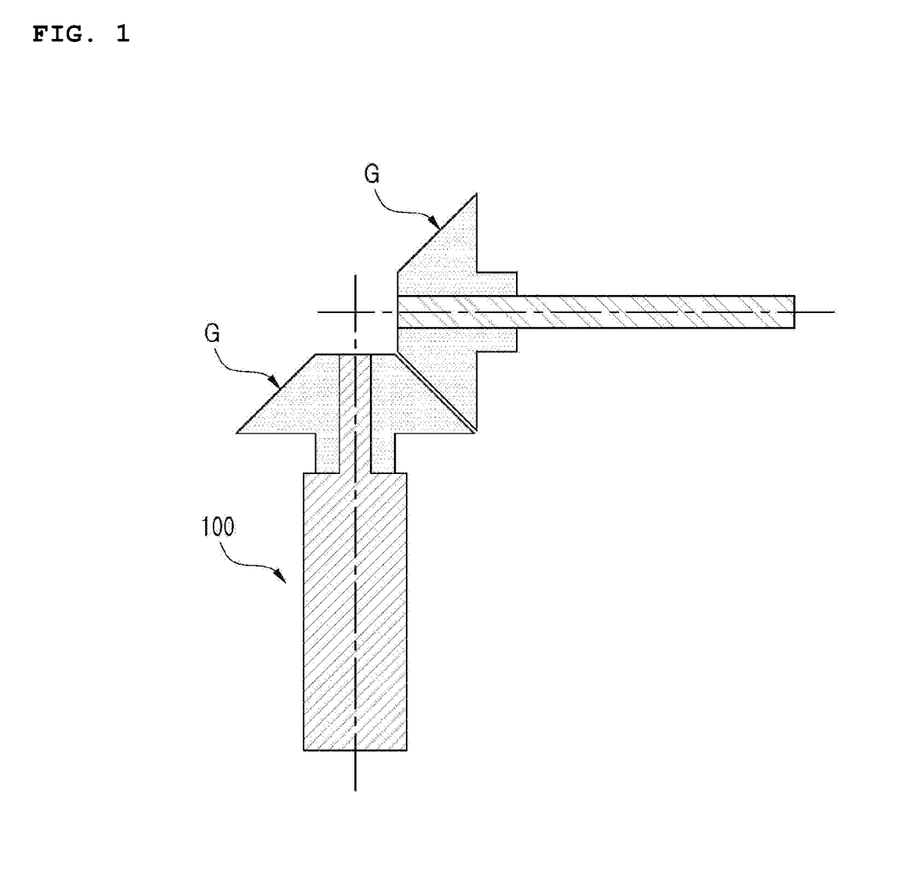
FIGS. 1 and 2 are views illustrating a state in which a bevel gear is mounted on a vibration reduction shaft according to an exemplary embodiment of the present disclosure.
Figure 2:
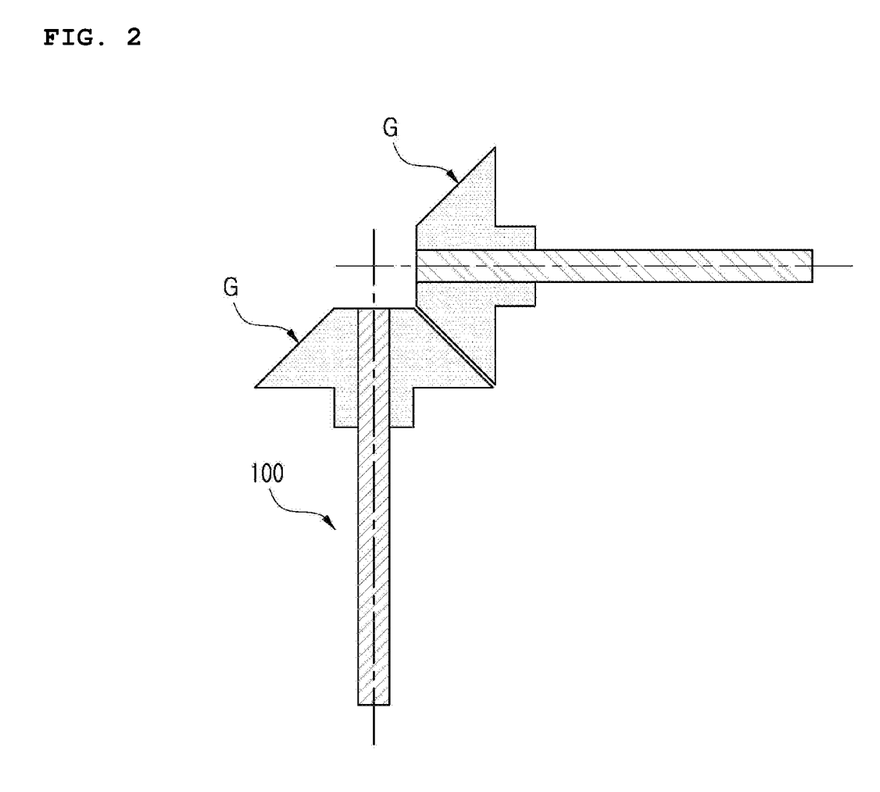

FIGS. 1 and 2 are views illustrating a state in which a bevel gear G is mounted on a vibration reduction shaft 100 according to an exemplary embodiment of the present disclosure.

The present disclosure relates to a vibration reduction device mainly used for a shaft for transmitting a rotation to a gear, and relates to a structure effective for a bevel gear as described above. However, the vibration reduction device is not necessarily used only for the bevel gear, and the vibration reduction device may be applied to any shaft as long as the shaft transmits rotational power. As an example, FIGS. 1 and 2 illustrate a state in which a bevel gear is provided at one end of a shaft, and in this state in which the bevel gear is connected to the shaft, there may be a region with a reduced diameter on a fastening portion as illustrated in FIG. 1, or the rotating shaft may be connected, as it is, to the bevel gear as illustrated in FIG. 2.

Figure 3:
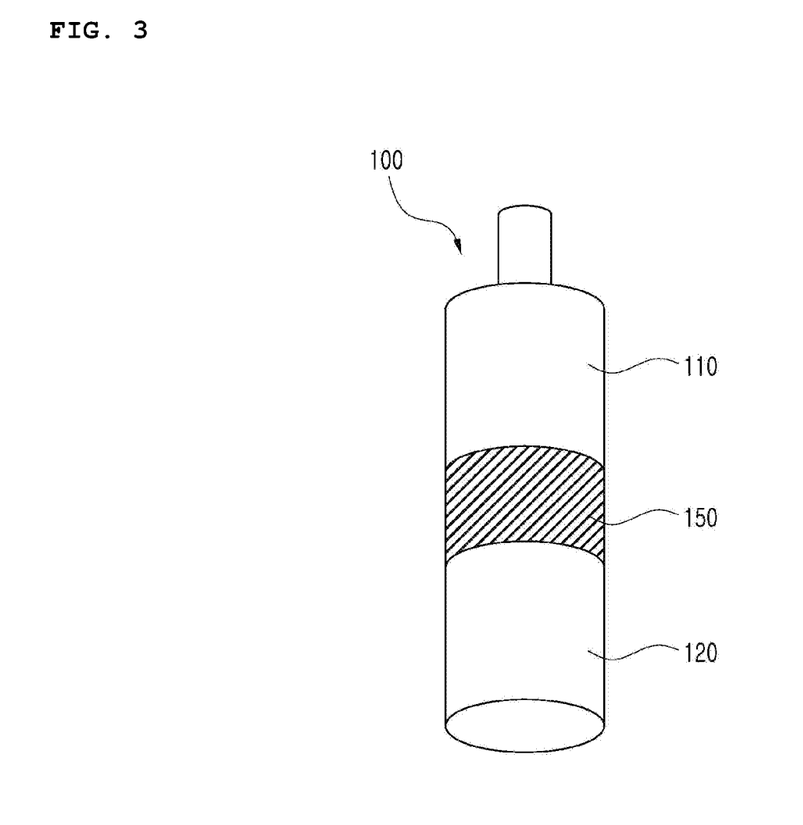
FIG. 3 is a perspective view illustrating an external appearance of the vibration reduction shaft according to the exemplary embodiment of the present disclosure.
Figure 4:
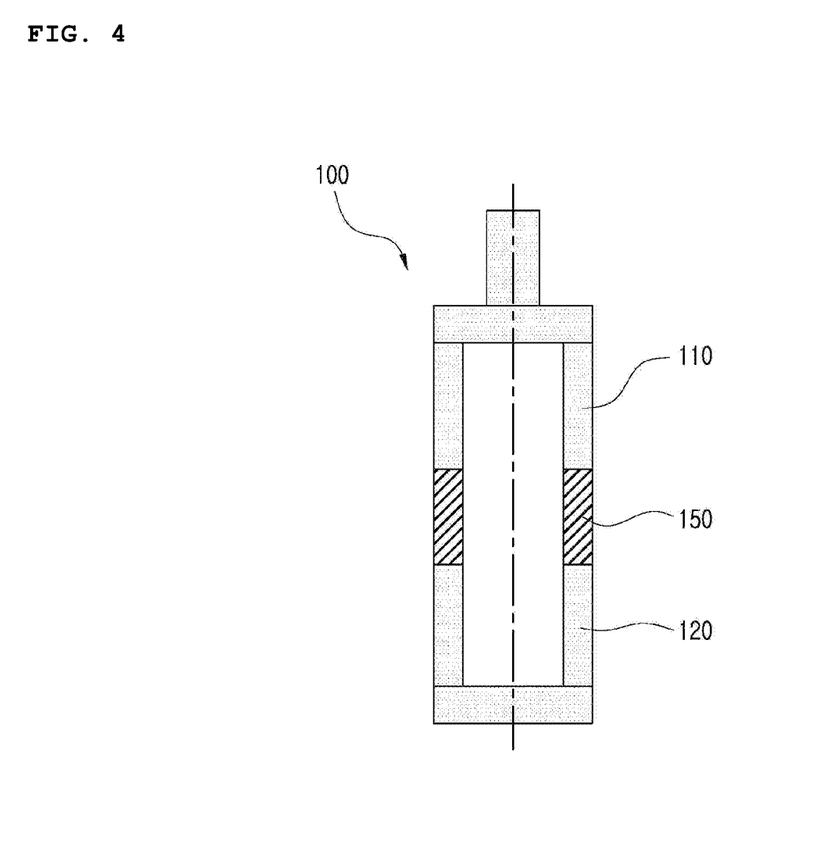
FIG. 4 is a longitudinal sectional view of the vibration reduction shaft according to the exemplary embodiment of the present disclosure.
Figure 5:
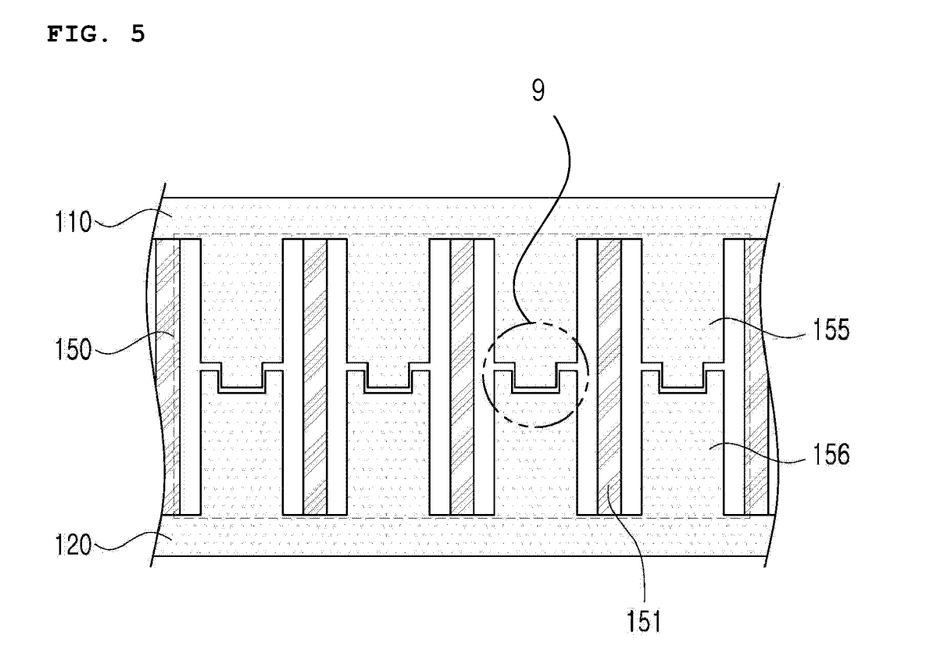
FIG. 5 is a development view illustrating a state in which a part of the vibration reduction shaft according to the present disclosure is spread.
Figure 9:
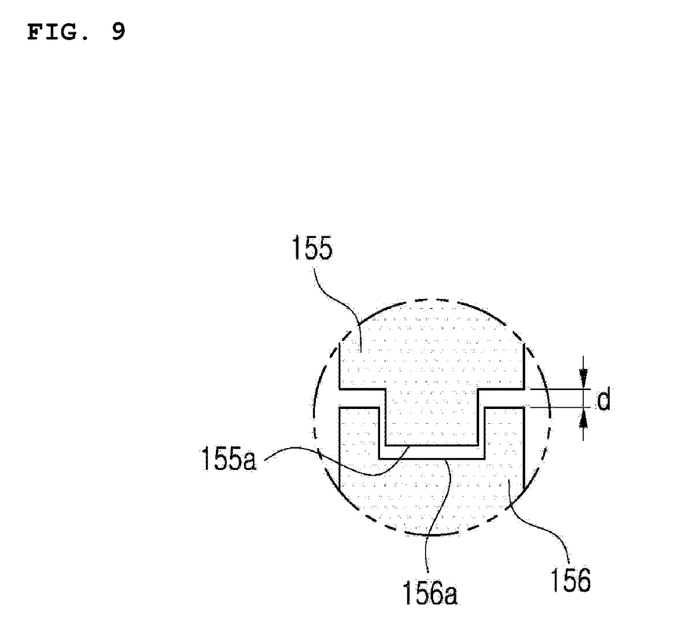
FIG. 9 is an enlarged view of a portion of the vibration reduction shaft in FIG. 5.

FIG. 3 is a perspective view illustrating an external appearance of the vibration reduction shaft according to the exemplary embodiment of the present disclosure, FIG. 4 is a longitudinal sectional view of the vibration reduction shaft according to the exemplary embodiment of the present disclosure, and FIG. 5 is a development view illustrating a state in which a part of the vibration reduction shaft according to the present disclosure is spread. That is, FIG. 5 illustrates a state in which the vibration reduction shaft in FIG. 3 is cut and spread in axial and longitudinal directions. FIG. 9 is an enlarged view of the encircled portion of the vibration reduction shaft as designated by a reference number 9 in FIG. 5.

An interior of the vibration reduction shaft 100 according to the exemplary embodiment of the present disclosure is configured as a cylindrical outer shaft having an inner hollow portion, and the outer shaft includes a first member 110 and a second member 120 which are disposed to be spaced apart from each other in the longitudinal direction of the shaft, and a vibration reduction region 150 which is disposed between the first member and the second member. Here, the vibration reduction region 150 is a region particularly devised in the present disclosure to reduce vibration occurring during a process of transmitting rotational force of the shaft. In the vibration reduction region, multiple connecting members 151, which connect, in the axial direction, the first member and the second member spaced apart from each other, are disposed in the axial direction, and the connecting members 151 are disposed to be spaced apart from one another. The connecting members serve to provide rigidity within the vibration reduction region and have appropriate cross-sectional areas required to sufficiently ensure supporting force against vertical operational force and lateral operational force.

The first member 110 is deformed with respect to axial torque, and as a result, the connecting member 151 is elastically deformed. With the elastic motion and the viscous motion of the connecting member, vibration is reduced by the vibration reduction shaft of the present disclosure.

Further, in the present disclosure, stoppers 155 and 156 may be provided to prevent yield deformation of the connecting member. The stoppers are disposed at upper and lower sides of the vibration reduction region and include a first stopper 155 which has one end attached to the first member and the other end formed with a protrusion 155a, and a second stopper 156 which has one end attached to the second member and the other end formed with a groove 156a that accommodates the protrusion 155a. In this case, the other end of the first stopper and the other end of the second stopper are spaced apart from each other at a predetermined interval d and configured so as not to be in contact with each other, such that the connecting member is positioned within an elastic deformation range. That is, when the connecting member is deformed to a predetermined level or more, the protrusion 155a of the first stopper and the groove 156a of the second stopper come into contact with each other before the yield deformation of the connecting member, thereby preventing further deformation. The stoppers may not be required in a case in which rigidity of the connecting member is sufficient.

Figure 6:
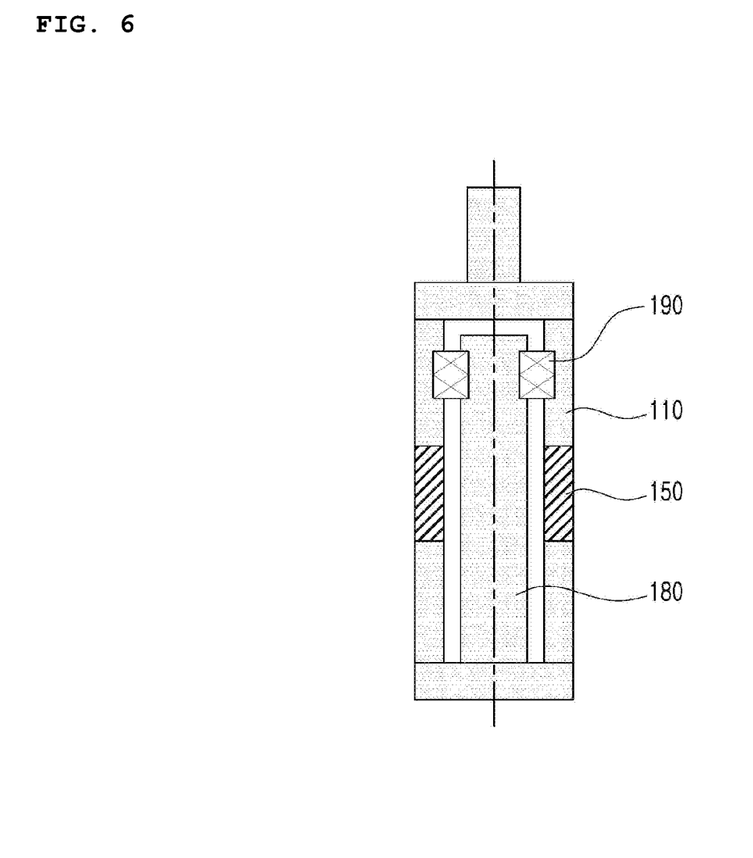
FIGS. 6 and 7 are longitudinal sectional views in which some configurations including an inner shaft are added to the vibration reduction shaft in FIG. 4.
Figure 7:
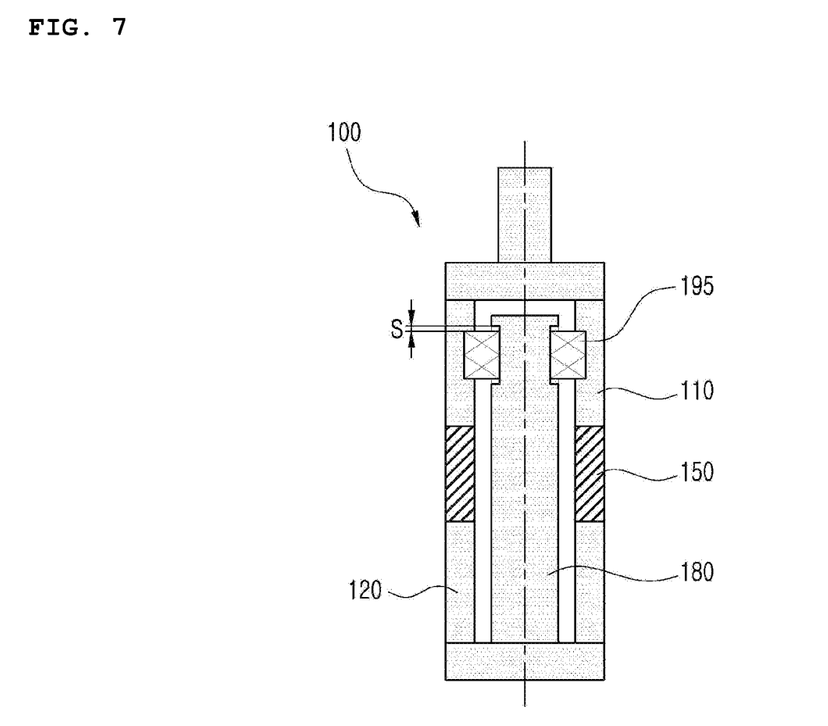

FIGS. 6 and 7 are longitudinal sectional views in which some configurations including an inner shaft are added to the vibration reduction shaft in FIG. 4, and an inner shaft 180, which has an outer diameter smaller than an inner diameter of the outer shaft, is disposed in the outer shaft. One end of the inner shaft 180 is integrally fixed to the second member 120, and the other end of the inner shaft 180 is not in contact with the first member 110 so that a small gap is formed between the other end of the inner shaft 180 and the first member 110. Further, a bearing 195 is provided at an appropriate position between the inner shaft and the outer shaft, and bearing accommodating grooves may be formed in an inner circumferential surface of the outer shaft and an outer circumferential surface of the inner shaft to accommodate the bearing. In this case, the disposed bearing 180 may be a slip type bearing (FIG. 7) which is allowed to slightly slip in the axial direction, or a stationary type bearing (FIG. 6) which does not slip. In FIG. 7, an axial width of the accommodating groove in the bearing is slightly larger than an axial length of the bearing so that a gap S is formed, such that an axial sip of the bearing is allowed.

Figure 8:
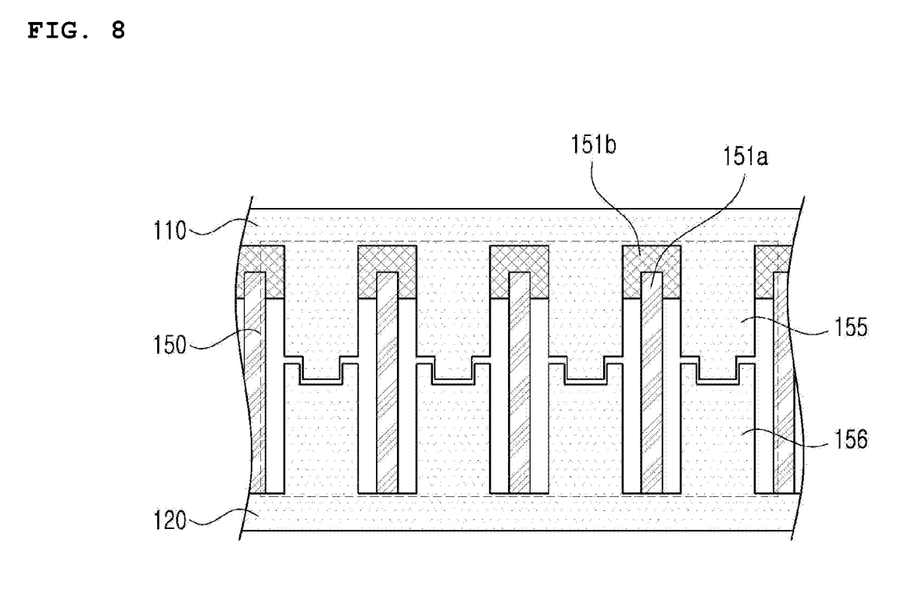
FIG. 8 is a development view of a vibration reduction shaft according to another exemplary embodiment of the present disclosure.

FIG. 8 is a development view of a vibration reduction shaft according to another exemplary embodiment of the present disclosure.

In the present exemplary embodiment, the illustrated vibration reduction shaft is made by partially changing the aforementioned vibration reduction shaft. That is, the present exemplary embodiment is similar to the aforementioned exemplary embodiment in that the cylindrical outer shaft having the inner hollow portion is provided, the first member 110 and the second member 120 are disposed to be spaced apart from each other in the longitudinal direction of the shaft, and the multiple connecting members 151, which connect the first member and the second member in the axial direction, are disposed to be spaced apart from one another within the vibration reduction region between the first member and the second member. However, the present exemplary embodiment differs from the aforementioned exemplary embodiment in that one of the ends of the connecting member is coupled through a damping material.

In other words, one end of the connecting member may be integrally coupled to any one of the first and second members, and the other end 151a of the connecting member may be coupled to the other of the first and second members through a damping material 151b. The damping material may be a material that has elasticity and may maximize a vibration damping effect.

In particular, the present exemplary embodiment illustrated in FIG. 8 may be applied in a case in which the stationary type bearing illustrated in FIG. 6 is provided. That is, vertical supporting force is supported by the stationary type bearing illustrated in FIG. 6, and the damping material is added within the separated vibration reduction region such that the damping effect is maximized, and the separated connecting members are applied such that deformation of the connecting members is minimized.

What is claimed is:
1. A vibration reduction shaft comprising:
a cylindrical outer shaft having an inner hollow portion, wherein the outer shaft includes:

a first member and a second member which are disposed to be spaced apart from each other in a longitudinal direction of the shaft; and a vibration reduction region which is disposed between the first member and the second member, and multiple connecting members, which connect the first member and the second member in an axial direction, are disposed to be spaced apart from one another within the vibration reduction region, wherein a first stopper, which has one end attached to the first member and the other end formed with a protrusion, and a second stopper, which has one end attached to the second member and the other end formed with a groove that accommodates the protrusion, are disposed between each of the multiple connecting members and within the vibration reduction region.

2. The vibration reduction shaft according to claim 1, wherein one end of the connecting member is integrally coupled to any one of the first and second members, and the other end of the connecting member is coupled to the other of the first and second members through a damping material.

3. The vibration reduction shaft according to claim 1, wherein the other end of the first stopper and the other end of the second stopper are spaced apart from each other at a predetermined interval d.

4. The vibration reduction shaft according to claim 1, wherein a bevel gear is mounted on the outer shaft.

\* \* \* \* \*